J. J. NELSON.
PROCESS OF LEACHING COPPER ORES.
APPLICATION FILED MAR. 26, 1918.

1,326,463.

Patented Dec. 30, 1919.

Inventor
John J. Nelson, by
his attorneys
Graham + Harris

UNITED STATES PATENT OFFICE.

JOHN J. NELSON, OF LOS ANGELES, CALIFORNIA, ASSIGNOR OF ONE-FOURTH TO OLUF H. WESTERGARD AND ONE-FOURTH TO BRYANT MATHEWS, BOTH OF LOS ANGELES, CALIFORNIA.

PROCESS OF LEACHING COPPER ORES.

1,326,463.   Specification of Letters Patent.   Patented Dec. 30, 1919.

Application filed March 26, 1918. Serial No. 224,912.

*To all whom it may concern:*

Be it known that I, JOHN J. NELSON, a citizen of the United States, residing at Los Angeles, in the county of Los Angeles and State of California, have invented a new and useful Process of Leaching Copper Ores, of which the following is a specification.

My invention relates to the art of recovering copper from copper ores, and particularly from carbonate, oxid, and silica ores which contain sulfate of copper.

In the operation of my process I prepare a leaching solution which consists of seventy-seven (77) parts of sodium bisulfate and twenty-three (23) parts of sodium chlorid. Sodium bisulfate and sodium chlorid are dissolved in water, using one hundred and sixty-seven (167) gallons of water to the ton of ore to be treated and using seventy-seven one hundredths (.77) pounds of sodium bisulfate and twenty-three one hundredths (.23) pounds of sodium chlorid to each pound of copper to be extracted.

The ore is first ground so that it will pass a sixteen mesh screen and the ore, with the leaching solution, is put into the leaching tanks in which the mixture is agitated during the extraction.

Figure 1:
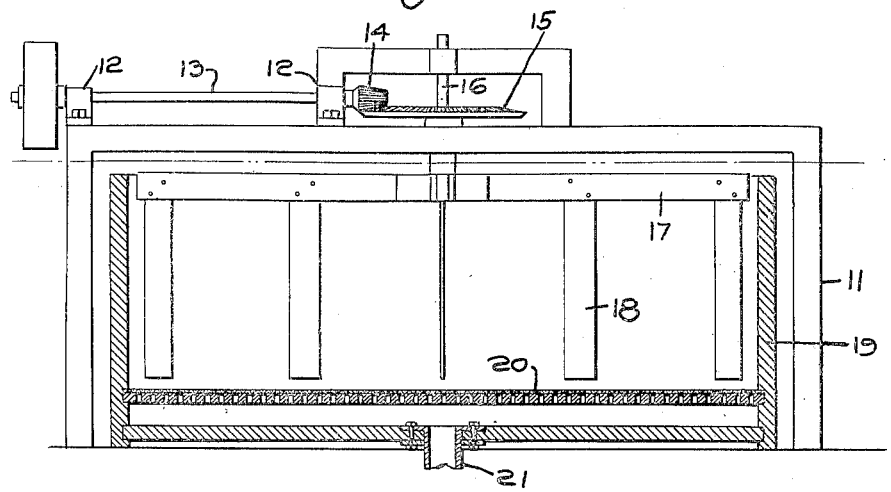
Figure 2:
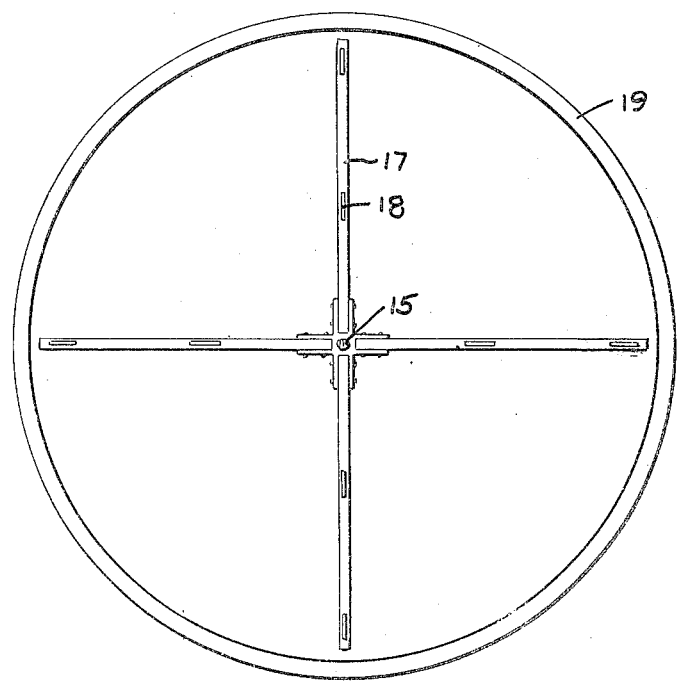

Such a leaching tank is illustrated in the annexed drawing in which Figure 1 is a vertical section and Fig. 2 is a plan view.

This tank consists of a frame 11 carrying bearings 12 in which a shaft 13 turns. The shaft 13 carries a bevel pinion 14 meshing with a bevel gear 15 which is fixed to a shaft 16. Carried on the shaft 16 is a frame work 17 supporting paddles 18. These paddles turn in a tank 19 having a screen bottom 20 below which is an outlet pipe 21.

In ore containing an excess of iron I find it advisable to strengthen the solution by from one to three per cent. in volume of sulfuric acid. In the case of ore containing an excess of lime I prefer to add from one to two per cent. muriatic acid.

After the reaction in the leaching tank is completed I filter the solution and pass it to a precipitating tank containing steel, preferably in a finely divided condition, for the purpose of precipitating the copper. In the precipitating tank I add not less than twenty (20) pounds of sodium chlorid per ton of solution to the copper solution for the purpose of preventing the copper from adhering to the steel. The copper appears as in the form of a precipitate in the bottom of the precipitating tank from which it may be readily removed.

What I claim is:—

A process of extracting copper from ores containing copper sulfate, which comprises leaching the ore with a solution containing sodium bisulfate and sodium chlorid, filtering the gangue from the solution after the ore has been subjected to the action of the solution for some time, passing said solution into a precipitating tank containing iron in a finely divided condition, adding sodium chlorid to the solution in the precipitating tank, and removing the precipitate from said tank.

In testimony whereof, I have hereunto set my hand at Los Angeles, California, this 19th day of March, 1918.

JOHN J. NELSON.